Patented Dec. 15, 1931

1,836,884

UNITED STATES PATENT OFFICE

FRITZ STRAUB AND WALTER ANDERAU, OF BASEL, SWITZERLAND, ASSIGNORS TO THE FIRM OF SOCIETY OF CHEMICAL INDUSTRY IN BASLE, OF BASEL, SWITZERLAND

AZO-DYESTUFFS AND PROCESS OF MAKING SAME

No Drawing. Application filed January 21, 1931, Serial No. 510,317, and in Switzerland January 23, 1930.

The present invention relates to the manufacture of new azo-dyestuffs. It comprises the process of making these new products, the products themselves, and the material which has been dyed with the new products.

The invention relates to the production of new azo-dyestuffs having the atom grouping

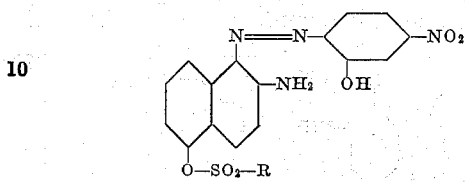

wherein R stands for an aryl residue, that is to say a benzene or naphthalene residue. The aryl residue may be substituted in various manners, such as, for example, by halogen, alkyl-, nitro-, O-alkyl-groups. The dyestuffs may further contain complex bound chromium in their molecule.

The new products are particularly suitable for dyeing artificial silk, such as viscose silk or copper silk, red to blue to green tints being obtained.

The production of the dyestuffs characterized by the above atom grouping may be carried out according to various methods. If for example diazotized 5-nitro-2-amino-1-phenol is coupled in an acid medium with a sulfo-aryl-ester of 2-amino-5-hydroxynaphthalene-7-sulfonic acid, red to blue dyeing dyestuffs are obtained. These dyestuffs, when treated with agents yielding chromium, may be converted into the valuable green dyeing dyestuffs. The same green dyeing products are also obtained by coupling diazotized 5-nitro-2-amino-1-phenol in an acid medium with 2-amino-5-hydroxynaphthalene-7-sulfonic acid and introducing into the resulting dyestuff the sulfo-aryl-residue and the chromium. The latter is best carried out by first treating the dyestuff with agents yielding chromium, and then esterifying the hydroxyl group of the naphthalene residue by means of an aryl-sulfo-chloride.

As agents yielding chromium there come into consideration both inorganic chromium salts, such as, for example, chromium fluoride, chromium sulfate, chromium chloride, and organic chomium salts, such as chromium acetate, chromium formate. The treatment with the agent yielding chromium may not only be performed in an acid medium, but also in an alkaline or neutral medium, with or without addition of acid binding agents.

The following examples illustrate the invention, the parts being by weight:—

Example 1

24 parts of 2-amino-5-hydroxynaphthalene-7-sulfonic acid are converted in presence of free alkali into the naphthol ester by means of 20 parts of para-toluene-sulfochloride. The naphthol ester is coupled in presence of free acid with the diazo-compound from 16 parts of 5-nitro-2-amino-1-phenol and when coupling is complete the dyestuff of the formula

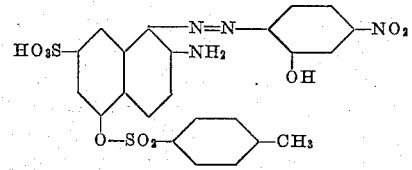

is separated and dried. It forms a dark powder which dissolves in water to blue-red, in soda solution to violet, in dilute caustic soda solution to red-blue, and in concentrated sulfuric acid to red-violet solutions. Artificial silk made from regenerated cellulose is dyed blue-red tints.

Example 2

The dyestuff obtained according to Example 1 is dissolved in 3000 parts of hot water and there are added 11 parts of $Cr_2O_3$ in the form of chromium fluoride, chromium formate or chromium sulfate and the whole is heated for 15 hours to boiling, the evaporated water being replaced. The new chromium compound is precipitated from the solution, filtered and dried. There is thus obtained a dark powder which dissolves in water, and better still in dilute alkali, to a green solution. In concentrated sulfuric acid it yields a blue-red solution.

Similar results are obtained if the azo-dyestuffs which are obtained from diazotized 5-nitro-2-amino-1-phenol and other sulfo-esters, such as, for example, benzene-sulfo-esters or naphthalene-sulfo-esters, are treated with agents yielding chromium.

*Example 3*

100 parts of viscose goods are entered into a dye-bath of 20° C. which contains 1 to 3 parts of the dissolved dyestuff obtained according to Example 2. In the course of ½ hour the temperature is raised to 75–80° C. and there are added to the dye-bath 30–40 parts of crystallized Glauber's salt, dyeing being continued for a further ¾ hour at the same temperature. Rinsing and drying follow. The artificial silk is dyed beautiful green tints which are remarkable for their uniformity, their fastness to light and their other excellent properties.

What we claim is:—

1. In the manufacure of chromiferous azo-dyestuffs the step consisting in coupling in an acid medium diazotized 5-nitro-2-amino-1-phenol with a compound of the general formula

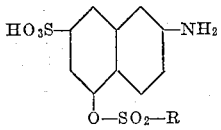

wherein R stands for a benzene or naphthalene radicle.

2. In the manufacture of a chromiferous azo-dyestuff the step consisting in coupling in an acid medium diazotized 5-nitro-2-amino-1-phenol with a compound of the formula

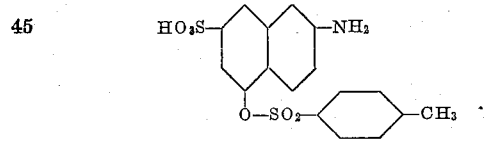

3. In the manufacture of chromiferous azo-dyestuffs the step consisting in treating with an agent yielding chromium the azo-dyestuffs of the general formula

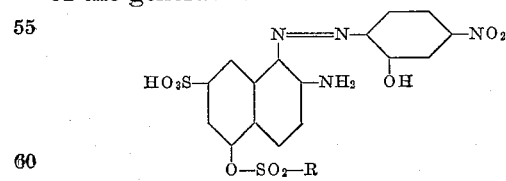

wherein R stands for a benzene or naphthalene radicle.

4. In the manufacture of a chromiferous azo-dyestuff the step consisting in treating with chromium-formate the azo-dyestuffs of the formula

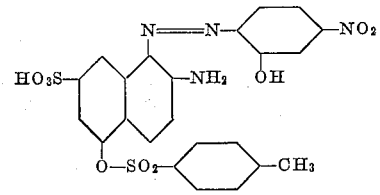

5. Process for the manufacture of chromiferous azo-dyestuffs, consisting in coupling in an acid medium diazotized 5-nitro-2-amino-1-phenol with a compound of the general formula

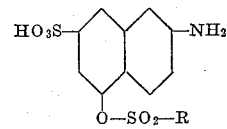

wherein R stands for a benzene or naphthalene radicle, and then treating the azo-dyestuff of the general formula

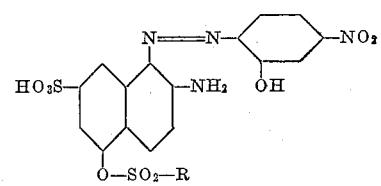

wherein R stands for an aryl residue, with an agent yielding chromium.

6. Process for the manufacture of a chromiferous azo-dystuff, consisting in coupling in an acid medium diazotized 5-nitro-2-amino-1-phenol with a compound of the formula

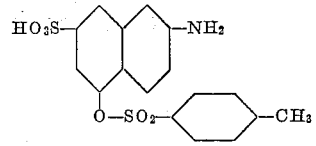

and then treating the azo-dyestuff of the formula

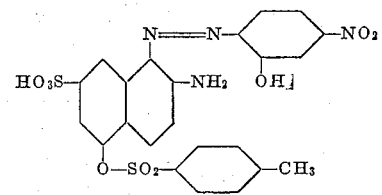

with the chromium-formate.

7. As new products the azo-dyestuffs having the atom grouping

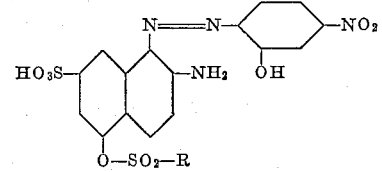

wherein R stands for a benzene or naphthalene radicle, which products form dark powders which dissolve in water, soda solution, dilute caustic soda solution and concentrated sulfuric acid to red, to blue, to green solutions, dyeing artificial silk made from regenerated cellulose, red to blue to green tints.

8. As new products the chromiferous azo-dyestuffs having the atom grouping

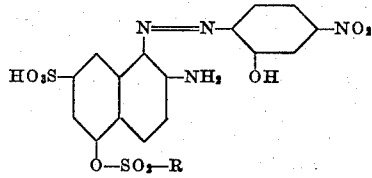

wherein R stands for a benzene or naphthalene radicle, which products form dark powders which dissolve in water and dilute alkalies to green and in concentrated sulfuric acid to red to blue solutions, dyeing artificial silk made from regenerated cellulose green tints of good fastness properties.

9. As a new product the chromiferous azo-dyestuff of the atom grouping

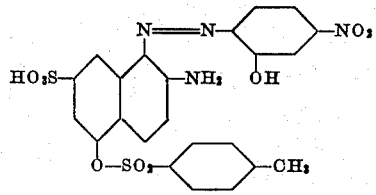

which product forms a dark powder which dissolves in water and dilute alkalies to green solutions and in concentrated sulfuric acid to a blue solution, dyeing artificial silk made from regenerated cellulose green tints of good fastness properties.

In witness whereof we have hereunto signed our names this 9th day of January, 1931.

FRITZ STRAUB.
WALTER ANDERAU.